United States Patent
Schultz

(10) Patent No.: US 9,065,927 B2
(45) Date of Patent: Jun. 23, 2015

(54) METHOD AND SYSTEM FOR PROVIDING CONTEXT BASED MULTIMEDIA INTERCOM SERVICES

(75) Inventor: Paul T. Schultz, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 499 days.

(21) Appl. No.: 12/903,460

(22) Filed: Oct. 13, 2010

(65) Prior Publication Data

US 2012/0093303 A1    Apr. 19, 2012

(51) Int. Cl.
*H04M 1/00* (2006.01)
*H04M 1/725* (2006.01)

(52) U.S. Cl.
CPC ...... *H04M 1/72569* (2013.01); *H04M 1/72566* (2013.01); *H04M 1/72572* (2013.01)

(58) Field of Classification Search
USPC ......... 379/48, 159–160, 167.01–176, 221.15, 379/142.01
See application file for complete search history.

(56) References Cited

U.S. PATENT DOCUMENTS

| | | | |
|---|---|---|---|
| 6,658,104 B1 * | 12/2003 | Carrion et al. | 379/220.01 |
| 2006/0035635 A1 * | 2/2006 | Kumagai | 455/426.2 |
| 2010/0218210 A1 * | 8/2010 | Smelyansky | 725/33 |

* cited by examiner

*Primary Examiner* — Yosef K Laekemariam

(57) ABSTRACT

An approach is provided for performing context based multimodal intercom sessions. A control signal to invoke an intercom service between two or more communication devices is received. Context information associated with one or more of the communication devices is determined. An intercom mode communication session among the communication devices is established. The context information is used to customize the intercom service for one or more of the communication devices.

17 Claims, 10 Drawing Sheets

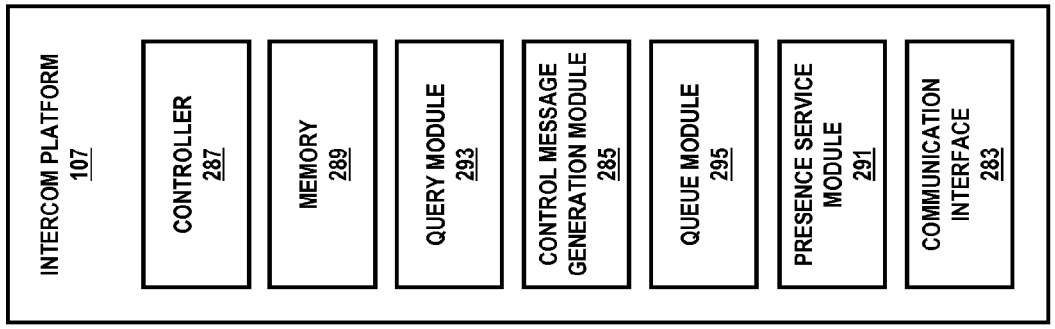
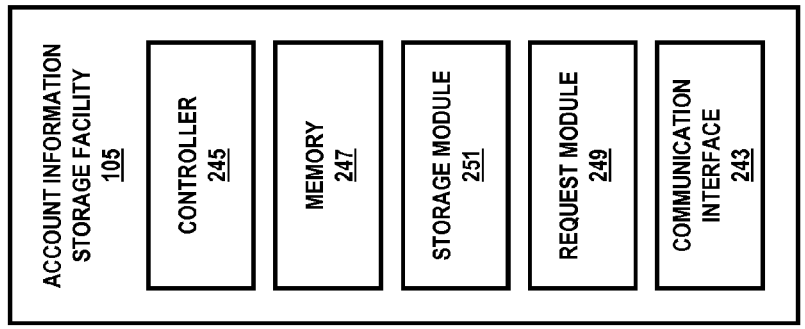
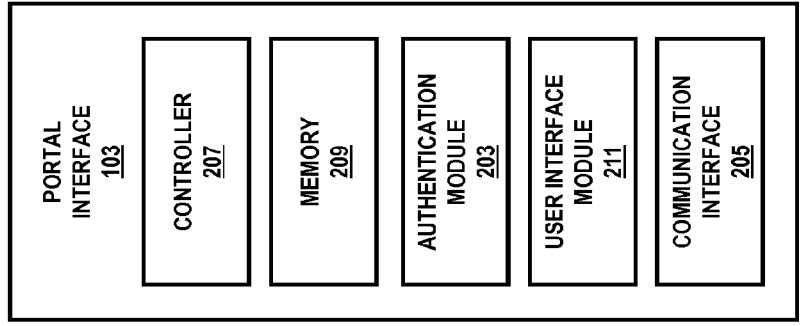

FIG. 7

Context/Mode Parameter Table
701

| Device ID. | Location | Presence | Initiation | Activity | Scheduling | Priority | Mode |
|---|---|---|---|---|---|---|---|
| XXXX | Car | | Incoming | Driving | | High | Hands free |
| XXXX | Car | | | Not Driving | | | Text |
| XXXX | Home | | | | | | Video |
| | | | | | | | |

703a 703b 703c 703d 703e 703f 703g 703h

METHOD AND SYSTEM FOR PROVIDING CONTEXT BASED MULTIMEDIA INTERCOM SERVICES

BACKGROUND INFORMATION

Consumers continue to rapidly expand the market for communication devices, particularly mobile devices, such as cellular telephones, laptop computers, pagers, personal digital assistants, and the like, in large part because of the rich set of services and convenience of mobility. Not surprisingly, to remain competitive, telecommunications service providers are continually challenged to develop services that offer greater convenience and seamlessness as consumers communicate using a variety of devices—ranging from mobile phones to wired handsets. Yet, the prevalence of communications among a variety of devices in different circumstances may at times prove inconvenient, and even dangerous. For example, a user may be driving a vehicle, whereby the user is required to input a string of digits to initiate a call, thereby increasing the likelihood of distractions while driving. Also, at times, the user may not be immediately able to initiate or answer a call because the user cannot physically operate the phone—e.g., a call is received when the user's hands are full or preoccupied with a task—but, yet is within audible distance from the phone. During such situations, the call is simply lost. Traditional hands-free (or speaker phone) operation can be useful under these circumstances, but such hands-free communication would need to be established prior to the user encountering the situation in the first place.

Therefore, there is a need for an approach that can efficiently and effectively provide communication services in a wide variety of contexts.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 2A-2C are respective diagrams of a portal interface, an account information storage facility, and an intercom platform that are configured to facilitate context based, multi-modal intercom communication services, according to various exemplary embodiments;

FIG. 7 is a table that shows context based communication modes for multiple devices, according to an exemplary embodiment;

DESCRIPTION OF THE PREFERRED EMBODIMENT

A preferred apparatus, method, and software for providing context based multi-modal intercom services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to certain types of communication devices, it is contemplated that various exemplary embodiments are also applicable to remotely configuring other devices, entities, facilities, systems, etc.

Figure 1:
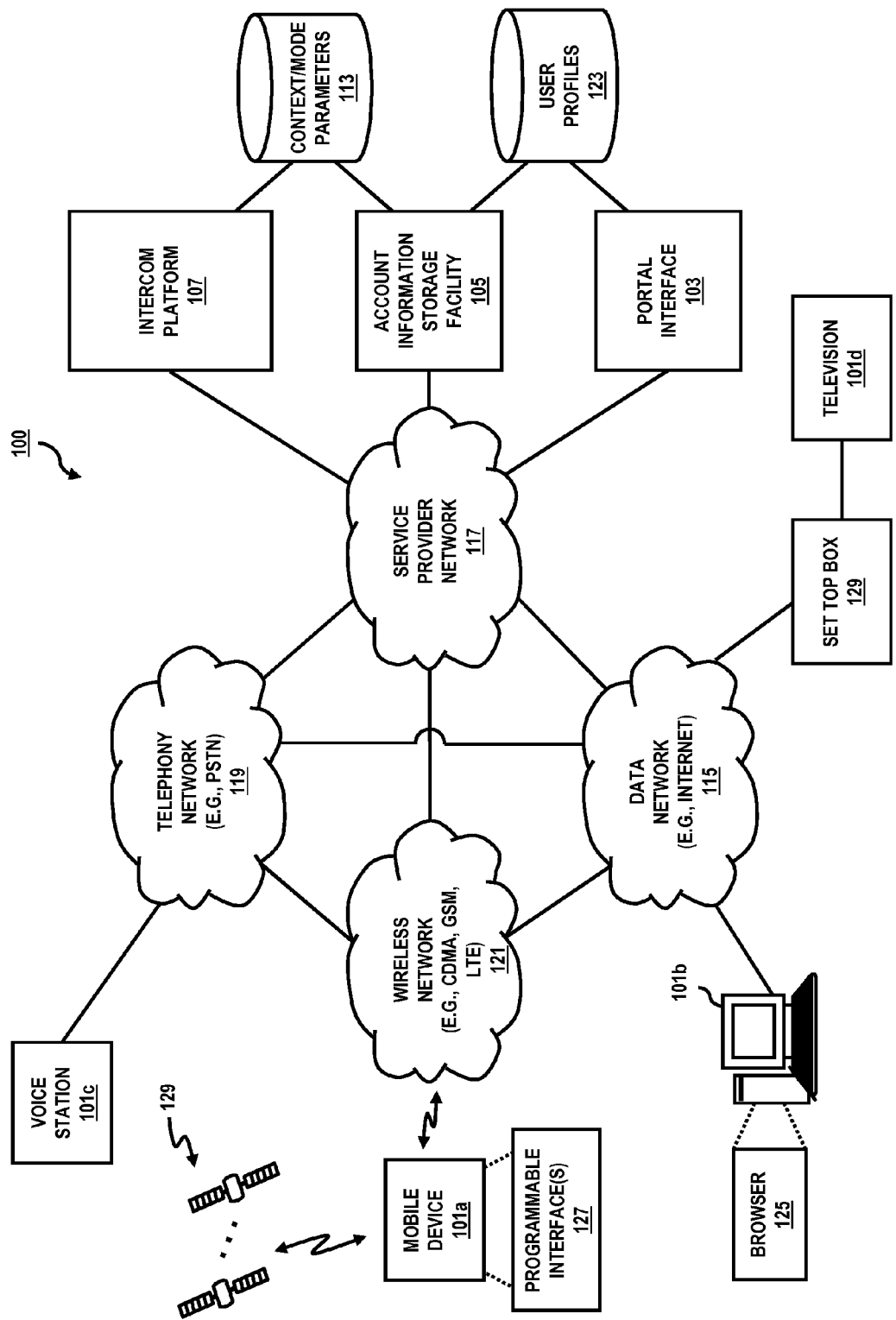
FIG. 1 is a diagram of a system configured to provide context based, multi-modal intercom communication services for a variety of communication devices, according to an exemplary embodiment.

FIG. 1 is a diagram of a system configured to provide context based, multi-modal intercom communication services for a variety of communication devices, according to an exemplary embodiment. For the purposes of illustration, system 100 for coordinating intercom services between one or more communications devices 101a, such as one or more cellular phones, one or more computer devices 101b, one or more voice stations 101c and one or more televisions 101d (collectively, "communication devices 101"), is described with respect to portal interface 103, account information storage facility 105, and intercom platform 107. (The television 101d has an associated set-top box 129. For convenience, any reference to the television 101d implies a reference to the combination of the television 101d and associated set top box 129).

In exemplary embodiments, users at any of the communication devices 101 may access intercom platform 107 to initiate an intercom session between any combination of other communication devices. The intercom sessions for any particular user may involve any combination of devices associated with that user and devices associated with any number of other users.

In exemplary embodiments, users at any of the communication devices 101 may access portal interface 103 to configure context based communication modes for their associated communication devices. Based on this user input, portal interface 103 may determine one or more context/mode parameters for remotely configuring the respective communications devices 101a, computer devices 101b and television 101d and store these one or more context/mode parameters to a networked repository (e.g., context/mode parameters repository 113) via account information storage facility 105. It is noted that the one or more context/mode parameters specify a communication mode associated with corresponding contexts.

In response to storing the one or more context/mode parameters, account information storage facility 105 may generate requests for remotely configuring communication devices 101 based on the one or more context/mode parameters and transmit the generated requests to intercom platform 107. Accordingly, intercom platform 107 may, in response to receiving one or more requests, retrieve corresponding context/mode parameters for respective communications devices 101 from context/mode parameters repository 113 and generate one or more control messages specifying the context/mode parameters for remotely configuring respective communications devices 101.

Accordingly, exemplary embodiments of system 100 enable subscribers (or users) to access portal interface 103 via one or more client devices (e.g., mobile device 101a, computing device 101b, voice station 101c, television 101d, or other stationary or mobile communication devices (not shown)) to register to the context based multi-modal intercom services and to create, customize, and/or manage one or more user profiles stored to, for example, user profiles repository 123 or any other suitable storage location of (or accessible to) the components or facilities of system 100. In this manner, subscribers may via, for example, a browser (or other networking application), such as browser 125, access portal interface 103 over one or more of networks 115-121 to program context based communication modes for the communication devices 101.

The context based programming is achieved by transmission of the context/mode parameters from user profiles repository 123 to account information storage facility 105, which stores the information in the context/mode parameters repository 113. According to exemplary embodiments, the context/mode parameters may be transmitted to account information storage facility 105 in association with an identifier that uniquely identifies the particular communications devices 101 that are intended to be remotely configured based on the context/mode parameter(s), such as unique directory addresses, electronic serial numbers, international mobile equipment identifiers, machine access control addresses, mobile directory numbers, mobile equipment identities, mobile identification numbers, internet protocol addresses port address, and/or any other suitable address or identifier. It is noted that portal interface 103 is more fully described with respect to FIG. 2A.

According to an exemplary embodiment, when an intercom session is invoked, the intercom platform 107 obtains context information from communication devices 101 and programs their communication modes based on the information in the context/mode parameters repository 113.

FIG. 2A is a diagram of a portal interface configured to facilitate context based multi-modal intercom services for communication devices, according to an exemplary embodiment. Portal interface 103 may comprise computing hardware (such as described with respect to FIG. 10), as well as include one or more components configured to execute the processes described herein to facilitate the context based multi-modal intercom services of system 100. In one implementation, portal interface 103 includes authentication module 203, communication interface 205, controller (or processor) 207, memory 209, and user interface module 211. Portal interface 103 may also communicate with one or more account storage facilities or repositories, such as account storage facility 105 and user profiles repository 123. Users may access portal interface 103 (or the features and functionalities provided thereby) via communication devices 101. While specific reference will be made to this particular implementation, it is also contemplated that portal interface 103 may embody many forms and include multiple and/or alternative components. For example, it is contemplated that the components of portal interface 103 may be combined, located in separate structures, or separate locations.

According to one embodiment, portal interface 103 embodies one or more application servers accessible to communication devices 101 over one or more networks 115-121. Users (or subscribers) can access portal interface 103 to create, customize, and manage one or more user profiles (such as for the purpose of registering communications devices 101 with the context based multi-modal intercom services of system 100). More particularly, portal interface 103 allows users to customize one or more context/mode parameters utilized to effectuate the context based multi-modal intercom services of system 100. As such, portal interface 103 may provide one or more user interfaces, e.g., web portals or other networked applications, to permit users to access the features and functions of portal interface 103 via communication devices 101. According to certain embodiments, user interface module 211 may be configured for exchanging information between client devices 101a-101d and browser applications (e.g., browser 125) or other network-based applications or systems, such as voice browsers or interactive voice recognition systems.

In exemplary embodiments, portal interface 103 via, for instance, user interface module 211 may be configured to execute one or more graphical user interfaces (GUI) that are configured to provide users with one or more menus of options for creating, customizing, and managing user profiles, as well as engaging with the other features and functions of portal interface 103. The user profiles are associated with context based communication mode information for communication devices 101. Controller 207, in conjunction with one or more instructions (or computer program code) stored to, for example, memory 209, may cause portal interface 103 to store context based communication modes associated with particular users and devices in the user profiles repository 123 (FIG. 1).

It is also noted that portal interface 103 may be configured to transmit the context/mode parameter(s) to account information storage facility 105 for storage to, for instance, context/mode parameters repository 113. As such, portal interface 103 via, for example, communication interface 205 may transmit the context/mode parameter(s) to account information storage facility 105 in association with one or more unique identifiers or addressing information corresponding to particular communications devices 101, such as one or more directory addresses, electronic serial numbers, international mobile equipment identifiers, machine access control addresses, mobile directory numbers, mobile equipment identities, and the like.

In order to provide selective access to the features and functions of portal interface 103, portal interface 103 may also include authentication module 203 for authenticating (or authorizing) users to portal interface 103. It is contemplated that authentication module 203 may operate in concert with communication interface 205 and/or user interface module 211. That is, authentication module 203 may verify user provided credential information acquired via communication interface 205 and/or user interface module 211 against corresponding credential information stored within a user profile of, for instance, user profiles repository 123. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via communication devices 101, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when communication devices 101 communicate with portal interface 103, such as a unique IP or MAC address. Other unobtrusive measures can be made available via voice prints, etc.

Additionally, portal interface 103 may include one or more controllers (or processors) 207 for effectuating the aforementioned features and functions, as well as one or more memories 209 for permanent and/or temporary storage of one or more of the aforementioned variables, parameters, information, signals, messages, identifiers, etc. In this manner, the features and functions of portal interface 103 may be executed by portal interface 103, such as in response to controller(s) 207 (or other components of portal interface 103) executing computer program code (or other instructions) stored to one or more memories 209.

Referring back to FIG. 1, account information storage facility 105 may be configured to receive one or more context/mode parameters from portal interface 103. According to exemplary embodiments, the context/mode parameters are received from portal interface 103 in association with, for example, one or more unique identifiers or addressing information corresponding to the particular one of the communication devices 101 to be remotely configured based on the context/mode parameters. As such, account information storage facility 105 may be configured to store the context/mode parameters to, for instance, context/mode parameters repository 113 according to one or more structured models, such as according to a relational database model. For instance, the at least one setting parameter may be stored in association with one or more attributes of mobile device 101, such as in association with the unique identifier or address received from portal interface 103. It is noted that the context/mode parameters may be stored to any other suitable storage location or memory of (or accessible to) account information storage facility 105. In this manner, the context/mode parameters may be stored to particular locations that may be uniquely identified based on, for instance, one or more extensible resource identifiers (XRI), internet protocol (IP) addresses, uniform resource identifiers (URI), uniform resource locators (URL), hypertext transfer protocol (HTTP) addresses, or other suitable addresses, identifiers, or locators.

According to one embodiment, described with reference to FIG. 9, communications devices 101 are programmed with context/mode information that the communication devices 101 then use to select an appropriate communication mode when an intercom session is established. According to this asynchronous configuration embodiment, in response to storing the one or more context/mode parameters, account information storage facility 105 may generate requests for remotely programming the communication devices based on the one or more stored context/mode parameters. Alternatively, account information storage facility 105 may generate requests in response to receiving context/mode parameter(s) from portal interface 103 or any other suitable trigger, such as based on a policy of a service provider of the context based multi-modal intercom services of system 100. According to exemplary embodiments, the requests may include (or otherwise specify) one or more addresses, identifiers, or locators for retrieving the context/mode parameter(s) from, for instance, context/mode parameters repository 113. In this manner, generated requests may be transmitted to intercom platform 107 for generating one or more control messages that, when received by communications devices 101, are configured to cause communications devices 101 to be remotely configured to select an appropriate communication mode based on context information determined by the communications devices 101. It is noted that account information storage facility 105 is described in more detail in association with FIG. 2B.

It is noted that the above mentioned control messages may be used in lieu of "software code," and therefore, may be directly integrated into the control logic of communications devices 101. In this manner, execution of certain ones of these control messages may require less processing than execution of conventional coded instructions. It is contemplated, however, that such conventional coded instructions may also be utilized. As such, these control messages may be utilized by programmable interfaces 127 to facilitate the context based multi-modal intercom services of system 100.

FIG. 2B is a diagram of an account information storage facility configured to facilitate context based multi-modal intercom services for communication devices, according to an exemplary embodiment. Account information storage facility (or facility) 105 may comprise computing hardware (such as described with respect to FIG. 10), as well as include one or more components configured to execute the processes described herein to facilitate the context based multi-modal intercom services of system 100. In one implementation, facility 105 includes communication interface 243, controller (or processor) 245, memory 247, request module 249, and storage module 251. Facility 105 may also communicate with one or more interfaces, platforms, or repositories, such as portal interface 103, intercom platform 107, context/mode parameters repository 113, and user profiles repository 123. While specific reference will be made to this particular implementation, it is also contemplated that facility 105 may embody many forms and include multiple and/or alternative components. For example, it is contemplated that the components of facility 105 may be combined, located in separate structures, or separate locations.

According to exemplary embodiments, facility 105 may be configured to receive one or more context/mode parameters from portal interface 103 via, for example, communication interface 243 over, for instance, service provider network 117. Received context/mode parameters may be ported to storage module 251 for storage to any suitable storage location or memory of (or accessible to) facility 105, such as context/mode parameters repository 113, memory 247, etc. As previously mentioned, received context/mode parameters may be received in association with one or more addresses or identifiers uniquely identifying mobile device(s) 101 to be configured based on the context/mode parameters and, therefore, may be stored via, for example, storage module 251 in association with the corresponding addresses and/or identifiers of communications devices 101. Further, storage module 251 may be configured to store the context/mode parameters in association with a unique XRI, IP address, URI, URL, HTTP address, or other suitable address, identifier, or locator, to uniquely identify a location at which the context/mode parameters may be retrieved.

According to an asynchronous configuration embodiment described with reference to FIG. 9, in response to storing the one or more context/mode parameters, request module 249 may be configured to generate requests for remotely configuring communications devices 101 based on the one or more stored context/mode parameters and associated mobile device addresses or identifiers. It is noted, however, that request module 249 may generate the request(s) in response to receiving the context/mode parameters from portal interface 103 or based on any other suitable trigger, such as based on a policy of a service provider of the context based multimodal intercom services of system 100. According to exemplary embodiments, the requests may be generated by request module 249 to include (or otherwise specify) one or more addresses, identifiers, or locators associated with context/mode parameters repository 113 that, for example, intercom platform 107 may utilize to retrieve the context/mode parameters.

Additionally, facility 105 may include one or more controllers (or processors) 245 for effectuating the aforementioned features and functions of facility 105, as well as one or more memories 247 for permanent and/or temporary storage of one or more of the aforementioned variables, parameters, information, signals, messages, identifiers, addresses, etc. In this manner, the features and functions of facility 105 may be executed by facility 105, such as in response to controller(s) 245 (or other components of facility 105) executing computer program code (or other instructions) stored to one or more memories 247.

According to one embodiment, described with reference to FIG. 9, communications devices 101 are programmed with context/mode information that the communication devices 101 then use to select an appropriate communication mode when an intercom session is established. Referring back to FIG. 1, according to this asynchronous communication embodiment, intercom platform 107 may be configured to receive requests from account information storage facility 105 over, for instance, service provider network 117 to remotely configure one or more communications devices 101 based on one or more context/mode parameters stored to, for instance, context/mode parameters repository 113. In response to receiving the requests, intercom platform 107 may retrieve corresponding context/mode parameters for respective communications devices 101 based on one or more addresses, identifiers, or locators uniquely identifying locations at which the context/mode parameters may be retrieved. According to exemplary embodiments, intercom platform 107 may generate one or more control messages specifying the corresponding context/mode parameters for remotely configuring respective communications devices 101. It is noted that communications devices 101 may, in exemplary embodiments, include one or more programmable interfaces 127, such as a set of programmable interfaces included within, for example, a binary runtime environment for wireless (BREW) platform or Android environment, for receiving control messages from intercom platform 107 and, thereby, for being remotely configured, monitored, tracked, etc. Additionally (or alternatively), one or more other programmable interfaces may be utilized, such as one or more programmable interfaces written in accordance with one or more programming languages, such as C, C++, J2ME, Java, etc. As such, control messages generated by intercom platform 107 may be generated for direction to one or more of these programmable interfaces 127.

Communications devices 101 may enter an unavailable state when, for instance, service signal strength to communications devices 101 diminish below acceptable levels or the devices enter one or more locations unfavorable to receiving control messages. As such, according to the asynchronous context/mode embodiment described with reference to FIG. 9, intercom platform 107 may be configured to queue transmission of respective control messages to corresponding communications devices 101 that intercom platform 107 determines to be powered off or otherwise unavailable to receive control messages. Thus, when these corresponding communications devices 101 become available, intercom platform 107 may remote the control messages from the queue(s) and, thereby, transmit the respective control messages to communications devices 101 when they become available to receive control messages. It is noted that intercom platform 107 is described in more detail with FIG. 2C.

FIG. 2C is a diagram of an intercom platform configured to facilitate context based multi-modal intercom services for communication devices, according to an exemplary embodiment. Intercom platform (or platform) 107 may comprise computing hardware (such as described with respect to FIG. 10), as well as include one or more components configured to execute the processes described herein to facilitate the context based multi-modal intercom services of system 100. In one implementation, platform 107 includes communication interface 283, control message generation module 285, controller (or processor) 287, memory 289, presence service module 291, query module 293, and queue module 295. Platform 107 may also communicate with one or more facilities or repositories, such as account information storage facility 105 and context/mode parameters repository 113. Furthermore, platform 107 is also configured to transmit control messages to communication devices 101. While specific reference will be made to this particular implementation, it is contemplated that platform 107 may embody many forms and include multiple and/or alternative components. For example, it is contemplated that the components of platform 107 may be combined, located in separate structures, or separate locations.

According to exemplary embodiments, platform 107 may be configured to receive via, for example, communication interface 283, one or more requests from account information storage facility 105 over, for instance, service provider network 117 to remotely configure one or more communications devices 101 based on one or more context/mode parameters stored to, for instance, context/mode parameters repository 113. It is noted that the context/mode parameters may specify at least one context based communication mode to be effected by respective communications devices 101 upon initiation of an intercom session. In certain embodiments, requests to remotely configure communications devices 101 may additionally include (or otherwise specify) one or more unique XRIs, IP addresses, URIs, URLs, HTTP addresses, or other suitable addresses, identifiers, or locators, to uniquely identify one or more location at which the context/mode parameters may be retrieved. As such, communication interface 283 may be configured to port received requests to query module 293 for extraction of the addresses, identifiers, locators, etc., and, thereby, to retrieve corresponding context/mode parameters from, for instance, context/mode parameters repository 113 at the specified addresses, identifiers, locators, etc. In addition to retrieving the context/mode parameters, query module 293 may also be configured to retrieve one or more mobile device addresses or identifiers corresponding to the requests, such as one or more directory addresses, electronic serial numbers, international mobile equipment identifiers, machine access control addresses, mobile directory numbers, mobile equipment identities, mobile identification numbers, internet protocol addresses, port addresses, and/or the like. It is noted that, in alternative embodiments, these addresses or identifiers may be additionally (or alternatively) specified by the received requests. As such, the addresses or identifiers may be parsed from the requests.

In exemplary embodiments, query module 293 may port the context/mode parameters and mobile device address(es)/identifier(s) to control message generation module 285 for generation of one or more control messages specifying the corresponding context/mode parameters for remotely configuring communications devices 101 corresponding to the mobile device address(es)/identifier(s). It is noted that the generation of control messages by control message generation module 285 may be performed so as to direct the control messages to one or more programmable interfaces 127 of communications devices 101, such as a set of programmable interfaces included within, for example, a BREW platform or Android platform configured to receive control messages. Alternatively, the control message(s) may be generated for direction to one or more other programmable interfaces 127 of mobile device 101, such as one or more programmable interfaces written in accordance with one or more programming languages, such as C, C++, J2ME, Java, etc. In this manner, generated control messages may be transmitted to communications devices 101 via, for example, communication interface 283. Transmission of control messages may occur over, for example, a data channel of one or more of networks 115-121, such as an existing access and control data channel of wireless network 121 conventionally utilized by a service provider of system 100 to distribute software updates to corresponding communications devices 101.

In an exemplary embodiment, control messages are provided to some or all of the communication devices 101 upon initiation of an intercom session by one or more of the communication devices 101. According to this synchronous configuration embodiment, an intercom initiation signal is received by the intercom platform 107 though the communication interface 283, which provides a device identification request to query module 293. Query module 293 determines which, if any, of the devices associated with the intercom session have entries in context/mode parameter repository 113. A context request is sent to such devices through communication interface 283, and context information is subsequently received from these devices through communication interface 283. The context information is provided to query module 293, which determines appropriate communication modes based on the context information and the pertinent entries within the context/mode parameter repository 113. The communication modes are encoded into control signals and sent to the devices in the manner previously described. An exemplary embodiment for synchronous provision of control signals is described with reference to FIG. 5.

In alternative embodiments wherein control messages are provided to communication devices asynchronously (FIG. 9), platform 107 may also include presence service module 291 for determining one or more conditions affecting the ability (or availability) of communications devices 101 to receive one or more generated control messages. That is, presence service module 291 may be configured to determine presence information related to, for example, whether or not communications devices 101 are network accessible (e.g., powered on) or network inaccessible (e.g., powered off). Additionally (or alternatively), presence service module 291 may be configured to determine other presence information, such as mobile device signal strength, spatial positioning information, user availability (e.g., available, busy, etc.), and the like. It is noted that these forms of presence information may be received from corresponding communications devices 101 and, thereby, tracked via presence service module 291 or presence service module 291 may "poll" communications devices 101 for the presence information. An exemplary model for presence determination is detailed in Internet Engineering Task Force (IETF) Request for Comment (RFC) 2778, which is incorporated herein by reference in its entirety. According to certain embodiments, the presence or availability of communications devices 101 may be utilized to determine whether control messages may be transmitted to communications devices 101.

It is noted that, for the asynchronous control message embodiment, in those instances when communications devices 101 are not "present" to receive generated control messages, platform 107 may queue the control messages via queue module 295. For instance, a particular mobile device 101 may be powered off, spatially positioned in a location unsuitable to receiving control messages, or unable to receive sufficient signal strength. As such, platform 107 may queue control messages for the particular mobile device 101 in one or more queues (not shown) of queue module 295. It is noted that queued control messages may be queued for transmission until the particular communications devices 101 are determined by, for instance, presence service module 291 to be available, e.g., powered on, suitably positioned, and receiving sufficient signal strength. In this manner, queued control messages may be removed from a corresponding queue of queue module 295 and transmitted to corresponding communications devices 101 when the communications devices 101 become available. It is noted that queued control messages may also be removed from a queue after a predetermined time period based on a policy of a service provider of the context based multi-modal intercom services of system 100, so as to prevent queues of queue module 295 from being inundated with control messages that may never be transmitted.

Additionally, platform 107 may include one or more controllers (or processors) 287 for effectuating the aforementioned features and functions of platform 107, as well as one or more memories 289 for permanent and/or temporary storage of one or more of the aforementioned variables, parameters, information, signals, messages, identifiers, addresses, locators, etc. In this manner, the features and functions of platform 107 may be executed by platform 107, such as in response to controller(s) 287 (or other components of platform 107) executing computer program code (or other instructions) stored to one or more memories 289.

As seen in FIG. 1, service provider network 117 enables communication devices 101 to access the features and functions of portal interface 103 via one or more of networks 115-121. Networks 115-121 may be any suitable wireline and/or wireless network. For example, telephony network 119 may include a circuit-switched network, such as the public switched telephone network (PSTN), an integrated services digital network (ISDN), a private branch exchange (PBX), or other like network. Wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), Long Term Evolution (LTE), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 115-121 may be completely or partially contained within one another, or may embody one or more of the aforementioned infrastructures. For instance, service provider network 117 may embody circuit-switched and/or packet-switched networks that include facilities to provide for transport of circuit-switched and/or packet-based communications. It is further contemplated that networks 115-121 may include components and facilities to provide for signaling and/or bearer communications between the various components or facilities of system 100. In this manner, networks 115-121 may embody or include portions of a signaling system 7 (SS7) network, or other suitable infrastructure to support control and signaling functions. As such, the conjunction of networks 115-121 may be adapted to facilitate the context based multi-modal intercom services of system 100.

It is noted that system 100 may also include satellite positioning system (SPS) technology, such as GPS technology; however, any other suitable navigational or location determination technology may be utilized, such as advanced forward link trilateration (A-FLT), assisted-GPS (A-GPS), enhanced cellular identification (CELL-ID), wireless area network (WLAN) positioning, etc. According to exemplary embodiments, the SPS technology of system 100 may be configured to utilize a constellation 129 of satellites that transmit signals to receivers (not shown) of, for example, one or more communications devices 101, so that the receivers may determine corresponding spatial positioning information (or locations), speeds, directions, and/or timing for communications devices 101. As such, communications devices 101 may be configured to report this spatial positioning information to, for instance, presence service module 291 to facilitate presence determinations and/or carrying out one or more actions specified by a control message.

According to exemplary embodiments, communication devices 101 may include any customer premise equipment (CPE) capable of sending and/or receiving information over one or more of networks 115-121. For instance, voice terminal 101c may be any suitable plain old telephone service (POTS) device, facsimile machine, etc., whereas mobile terminal 101a may be any cellular phone, radiophone, satellite phone, smart phone, wireless phone, or any other suitable mobile device, such as a personal digital assistant (PDA), pocket personal computer, tablet, customized hardware, etc. Further, computing device 101b may be any suitable computing device, such as a VoIP phone, skinny client control protocol (SCCP) phone, session initiation protocol (SIP) phone, IP phone, personal computer, softphone, workstation, terminal, server, television system, etc. Even though only a limited number of communications devices 101 are illustrated, it is contemplated that system 100 can support a plurality of communication devices 101.

As previously mentioned, system 100 includes user profiles repository 123 for storing subscriber information, such as billing information, contact information, calendar information, demographic information, location information, mobile device configurations, subscription parameters, communications history information, and the like. User profiles repository 123 may also be utilized to store data relating to authorized users of the context based multi-modal intercom services of system 100, as well as associated authorization information corresponding to the users. Context/mode parameters repository 113 may be configured to store one or more context/mode parameters specifying context based communication modes to be effected by communications devices 101 upon initiation of an intercom session.

According to exemplary embodiments, repositories 113 and 123 may be maintained by a service provider of the context based multi-modal intercom services of system 100 or may be maintained by any suitable third-party. It is contemplated that the physical implementation of repositories 113 and 123 may take on many forms, including, for example, portions of existing repositories of a service provider, new repositories of a service provider, third-party repositories, and/or shared-repositories. As such, repositories 113 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 113 and 123 are provided in distributed fashions, information and content available via repositories 113 and 123 may be located utilizing any suitable querying technique, such as electronic number matching, distributed universal number discovery (DUNDi), uniform resource identifiers (URI), etc.

Figure 3:
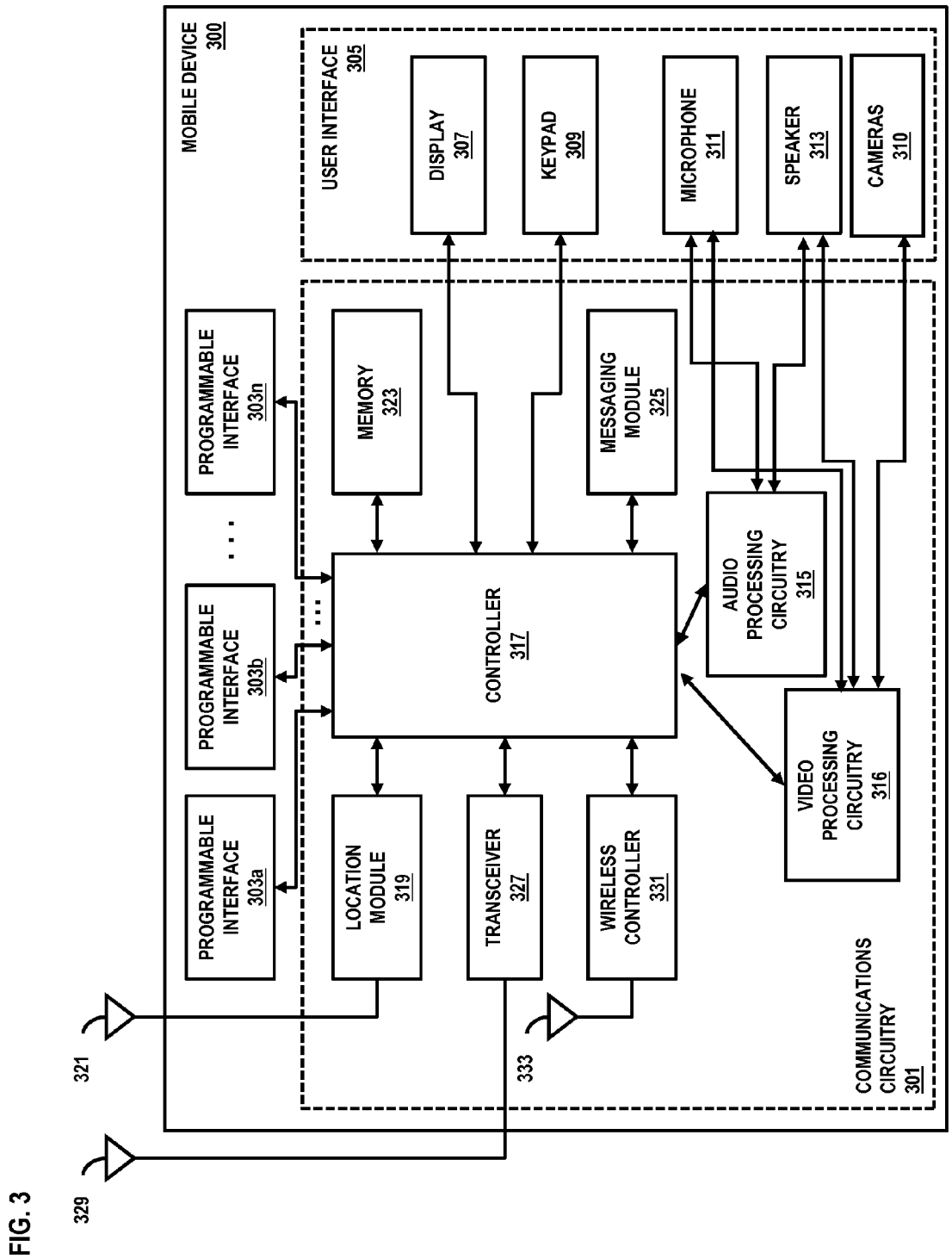
FIG. 3 is a diagram of a mobile device configured to facilitate context based, multi-modal intercom communication services, according to an exemplary embodiment.

FIG. 3 is a diagram of a mobile device configured to facilitate context based, multi-modal intercom communication services, according to an exemplary embodiment. Mobile device 300 (e.g., mobile device 101 of FIG. 1) may comprise computing hardware (such as described with respect to FIG. 10), as well as include one or more components configured to execute the processes described herein for facilitating the context based multi-modal intercom services of system 100. In this example, mobile device 300 includes communications circuitry 301, programming interfaces 303a-303n, and user interface 305. While specific reference will be made hereto, it is contemplated that mobile device 300 may embody many forms and include multiple and/or alternative components.

According to exemplary embodiments, user interface 305 may include one or more displays 307, keypads 309, microphones 311, and/or speakers 313. Display 307 provides a graphical user interface (GUI) that permits a user of mobile device 300 to view dialed digits, call status, menu options, device configurations, and other service information. The GUI may include icons and menus, as well as other text and symbols. Keypad 309 includes an alphanumeric keypad and may represent other input controls, such as one or more button controls, dials, joysticks, touch panels, etc. As such, a user may utilize one or more components of user interface 305 to construct user profiles, enter commands, initialize applications, input remote addresses, select options from menu systems, and the like. In this manner, it is noted that microphone 311 coverts spoken utterances of a user (or other auditory sounds, e.g., environmental sounds) into electronic audio signals, whereas speaker 313 converts audio signals into audible sounds.

Communications circuitry 301 may include audio processing circuitry 315, video processing circuitry 316, controller 317, location module 319 (such as a GPS receiver) coupled to antenna 321, memory 323, messaging module 325, transceiver 327 coupled to antenna 329, and wireless controller 331 coupled to antenna 333. Memory 323 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 323 may be implemented as one or more discrete devices, stacked devices, or integrated with controller 317. Memory 323 may store information, such as one or more user profiles, one or more user defined policies, one or more contact lists, personal information, sensitive information, work related information, configurable context/mode parameters, and the like.

Mobile device 300 also includes messaging module 325 that is configured to receive, transmit, and/or process messages (e.g., EMS messages, SMS messages, MMS messages, IM messages, electronic mail messages, SIP Message method messages, and/or any other suitable message) received from (or transmitted to) any suitable component or facility of system 100, as well as from (or to) one or more other mobile devices (not shown) or destinations. As previously mentioned, intercom platform 107 may transmit control messages to mobile device 300 in the form of one or more programmable interface directed messages, e.g., one or more BREW or Android directed control messages. As such, messaging module 325 and/or controller 317 may be configured to identify such control messages and to parse context/mode parameters therefrom.

In response to certain types of control messages, the controller 317 is configured to obtain context information and/or configure the mode of communication with the user. The context information may include, without limitation, the location of the mobile device 300 determined by location module 319 or user activity/presence information that may be entered by a user through one of the programmable interfaces 303a-303n or via user interface 305. The communication mode is also set by the controller 317 in response to a control message processed by the messaging module 325. Examples of communication modes include, without limitation, voice communication, which is implemented by audio processing circuitry 315, microphone 311 and speaker 313, and text communication, which is implemented by display 307 and keypad 309.

Even though not illustrated, it is contemplated that mobile device 300 may also include one or more applications and, thereby, may store (via memory 323) data (and/or context/mode parameters) associated with these applications for providing users with browsing functions, business functions, calendar functions, communication functions, contact managing functions, data editing (e.g., database, word processing, spreadsheets, etc.) functions, financial functions, gaming functions, imaging functions, location determination functions, messaging (e.g., electronic mail, instant messaging, enhanced messaging, multimedia messaging, short messaging, etc.) functions, multimedia functions, service functions, storage functions, synchronization functions, task managing functions, querying functions, and the like. As such, control messages received by mobile device 300 from, for example, intercom platform 107 may be utilized by one or more of programmable interfaces 303a-303n and/or controller 317 to facilitate remote configuration, modification, and/or utilization of one or more features, options, settings, etc., of these applications. It is also contemplated that these (or other) control messages may be utilized by controller 317 to facilitate remotely backing up and/or erasing data associated with these applications. In other instances, the control messages may cause mobile device 300 to become completely or partially deactivated or otherwise inoperable.

Accordingly, controller 317 may be configured to control the operation of mobile device 300, such as in response to commands received from programmable interfaces 303a-303n and/or data stored to memory 323. Control functions may be implemented in a single controller or via multiple controllers. Suitable controllers 317 may include, for example, both general purpose and special purpose controllers and digital signal processors. Controller 317 may interface with audio processing circuitry 315, which provides basic analog output signals to speaker 313 and receives analog audio inputs from microphone 311. In exemplary embodiments, controller 317 may be controlled by programmable interfaces 303a-303n in order to "lock" access to memory 323 and, thereby, prevent data disclosure therefrom, enable one or more communication limitations (e.g., limiting voice and messaging communications via messaging module 325 and transceiver 327 to certain designated directory addresses, disabling data communication functions of controller 317, etc.) to prevent unauthorized use of mobile device 300, image (or backup) memory 323 to prevent complete loss of information stored to memory 323, format (or erase) memory 323 to purge mobile device 300 of personal or otherwise sensitive information, as well as perform other similar or suitable actions to safeguard information stored to and prevent unauthorized use of mobile device 300. For example, other suitable actions may include configuring presentations of display 307 to ask for help in returning mobile device 300 to its rightful owner, defining one or more contact addresses within memory 323 for the rightful owner to be reached, configuring one or more audio, visual, and/or tactile alerts to be presented via display 307, speaker 313, and/or other user interface components of mobile device 300 so as to bring attention to mobile device 300, "bricking" mobile device 300 to prevent subsequent use of mobile device 300, causing location module 319 to determine spatial positioning information corresponding to a location of mobile device 300, and the like. It is noted that, in certain embodiments, the control messages may be utilized to transmit spatial positioning information, memory images, etc., to one or more destinations via transceiver 327 and/or wireless controller 331. In this manner, controller 317 and/or one or more of programmable interfaces 303a-303n may be remotely configured and/or controlled via received control messages that cause mobile device 300 to perform one or more specified actions.

It is noted that real time spatial positioning information may be obtained or determined via location module 319 using, for instance, satellite positioning system technology, such as GPS technology. In this way, location module 319 can behave as (or substantially similar to) a GPS receiver. Thus, mobile device 300 employs location module 319 to communicate with constellation 129 of satellites. These satellites 129 transmit very low power interference and jamming resistant signals received by GPS receivers 319 via, for example, antennas 321. At any point on Earth, GPS receiver 319 can receive signals from multiple satellites, such as six to eleven. Specifically, GPS receiver 319 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites 129. Thus, if mobile device 300 is able to identify signals from at least four satellites 129, receivers 319 may decode the ephemeris and clock data, determine the pseudo range for each satellite 129 and, thereby, compute the spatial positioning of a receiving antenna 321. With GPS technology, mobile device 300 can determine its spatial position with great accuracy and convenience. It is contemplated, however, that location module 319 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

It is also noted that mobile device 300 can be equipped with wireless controller 331 to communicate with a wireless headset (not shown) or other wireless network. The headset can employ any number of standard radio technologies to communicate with wireless controller 331; for example, the headset can be BLUETOOTH enabled. It is contemplated that other equivalent short range radio technology and protocols can be utilized.

Figure 4:
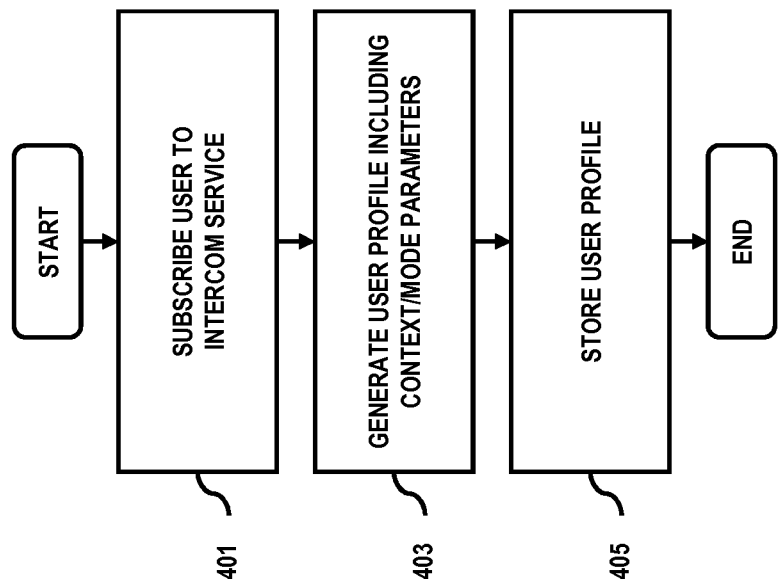
FIG. 4 is a flowchart of a process for subscribing a user to context based, multi-modal intercom communication services, according to an exemplary embodiment.

FIG. 4 is a flowchart of a process for subscribing a user to context based multi-modal intercom services, according to an exemplary embodiment. For illustrative purposes, the process is described with respect to FIGS. 1 and 2. It is noted that the steps of the process may be performed in any suitable order, as well as combined or separated in any suitable manner. At step 401, portal interface 103 subscribes a user associated with one or more mobile devices (e.g., mobile device 101a) to the intercom services of system 100. According to one embodiment, the user may subscribe utilizing any suitable client device capable of processing and transmitting information over one or more of networks 115-121, such as computing device 101b. Namely, the user may interact with an input interface (e.g., a keyboard, interactive voice response (IVR) interface, etc.) of, for example, computing device 101b to activate software resident on device 101b, such as a GUI or other networked application, that interfaces with (or is implemented by) portal interface 103. Alternatively, the user may interact with a voice portal (not shown) interfacing with (or implemented by) portal interface 103, wherein speech synthesis and voice recognition techniques are utilized to prompt the user for various information and to reduce spoken utterances of the user and/or other signals (e.g., dual tone multi-frequency signals) associated with the user to one or more corresponding inputs. As such, the user can register as a new subscriber to the context based multi-modal intercom services and may obtain sufficient authentication information for establishing future sessions with portal interface 103.

According to certain embodiments, registration procedures may prompt the user to identify communications devices 101 that the user may utilize to access the features and functions of the context based multi-modal intercom services of system 100. In this manner, the user may uniquely identify these devices 101a-101d by entering appropriate device information (or identifiers), such as one or more device types, serial numbers, registration numbers, MAC addresses, directory addresses, communications links, etc., corresponding to devices 101a-101d. In certain exemplary embodiments, portal interface 103 may obtain corresponding configuration and/or interfacing information relating to these devices from, for example, one or more manufacturers or other third-party suppliers over, for instance, data network 115. It is noted that this configuration and/or interfacing information may be utilized by portal interface 103 and/or intercom platform 107 to facilitate the context based multi-modal intercom services of system 100. Furthermore, the configuration and/or interfacing information may be stored to any suitable storage location or memory of (or accessible to) system 100, such as repositories 113 and 123.

Once registered (or as part of the registration process), portal interface 103 enables the user, per step 403, to generate and/or customize a user profile. The user profile may include addressing information (e.g., directory number, electronic serial number, international mobile equipment identifier, machine access control address, mobile directory number, mobile equipment identity, mobile identification number, internet protocol address, port address, and/or any other suitable address) corresponding to identified communication devices 101a-101d that the user desires to register with the context based multi-modal intercom services of system 100. The user profile may also include context based multi-modal communication parameters (context/mode parameters) for any or all of the communication devices 101. Once a user is registered, the context/model parameters may be altered, and the user may submit context/mode parameters for additional communications devices.

At step 405, portal interface 103 stores the user to a list of subscribers to the context based multi-modal intercom services of system 100, as well as stores the generated user profile, which includes context/mode parameters, authentication information, device identifiers, etc., to, for example, user profiles repository 123. It is noted that portal interface 103 may additionally (or alternatively) store or synchronize this user profile information to any suitable storage location or memory of (or accessible to) portal interface 103. Further, it is contemplated that users may directly interact with profiles repository 123. In addition, in step 405, portal interface 103 transmits the context/mode parameters to account information storage facility 105 for storage to, for instance, context/mode parameters repository 113. It is noted that portal interface 103 may transmit the context/mode parameters to account information storage facility 105 in association with one or more unique identifiers or addressing information corresponding to mobile device 101, such as one or more directory numbers, electronic serial numbers, international mobile equipment identifiers, machine access control addresses, mobile directory numbers, mobile equipment identities, and the like.

Figure 5:
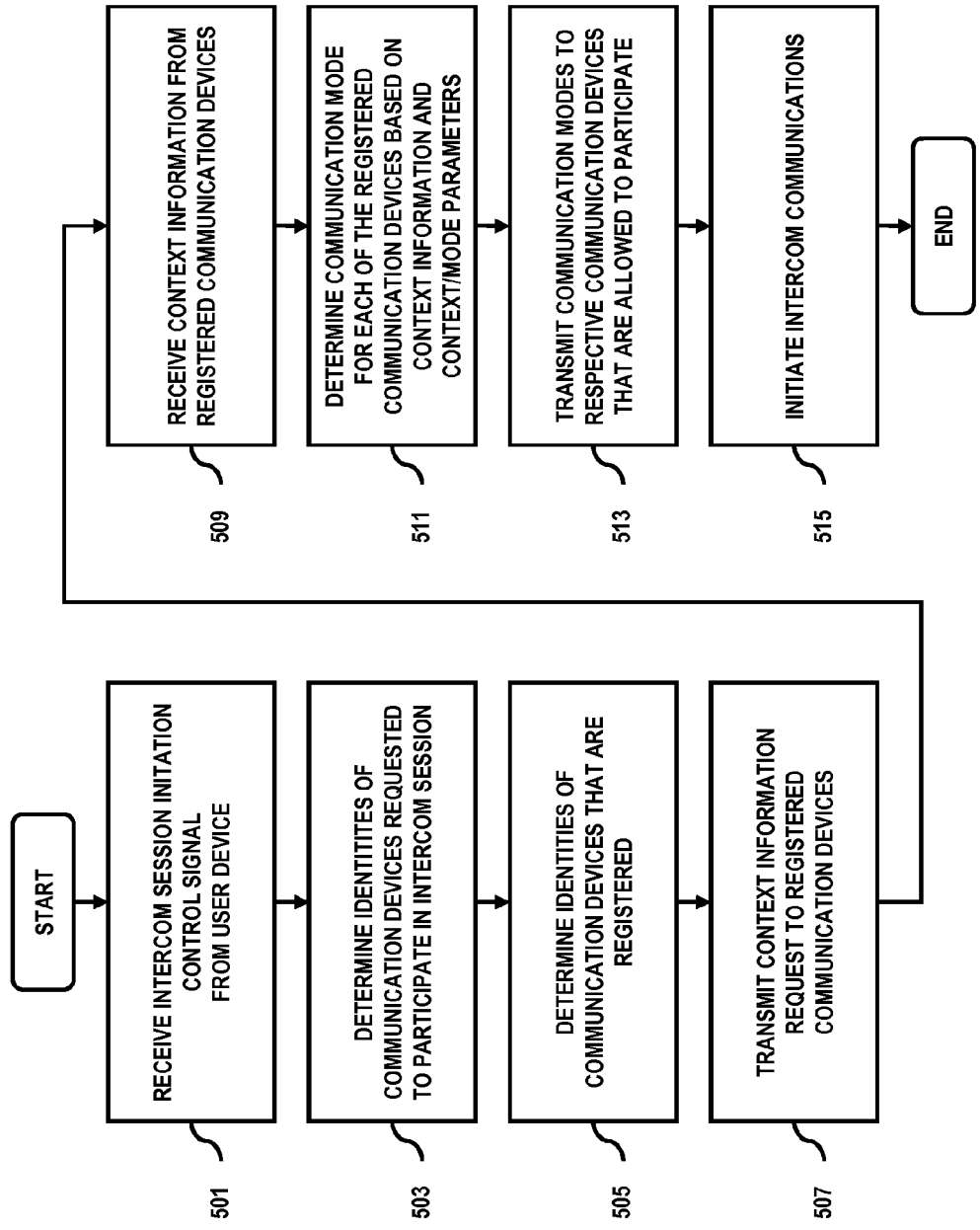
FIG. 5 is a flowchart of a process for coordinating a context based, multi-modal intercom communication session, according to an exemplary embodiment.

FIG. 5 is a flowchart of a process for coordinating a context based, multi-modal intercom communication session, according to an exemplary embodiment. For illustrative purposes, the process is described with respect to FIGS. 1 and 2. It is assumed that a user (or owner) associated with one of the communication devices 101 has subscribed to the context based multi-modal intercom services of system 100. Still further, it is noted that the steps of the process may be performed in any suitable order, as well as combined or separated in any suitable manner. At step 501, intercom platform 107 receives via, for example, communication interface 283, a control signal that corresponds to a request to initiate an intercom session. The request may be initiated by a user through interaction with one of the communication devices 101, and is conveyed to the portal interface through one or more of the networks 115-121. Alternatively, the intercom session request may be conveyed directly to the intercom platform 107.

In step 503, intercom platform 107 determines the identities of the communication devices 101 that are requested to participate in the intercom session. That is, controller 287, in conjunction with one or more instructions (or computer program code) stored to memory 289, may cause intercom platform 107 to determine the specific identifiers of the communication devices 101 requested to participate in the intercom session.

Next, in step 505, intercom platform 107 determines which of the communication devices 101 have previously been registered and therefore have entries in the repository 113. By way of example, intercom platform 107 may perform this step by providing the identities of the requested communications devices 101 to query module 293, which searches the repository 113 for matches to these identities.

In step 507, the intercom platform 107 then issues to the registered devices requests for context information. In the case where a registered device is a mobile device, such as mobile device 300 (FIG. 3), the context information may include, without limitation, the location of the mobile device 300 determined by location module 319 or user activity/presence information that may be entered by a user through one of the programmable interfaces 303a-303n. In step 509, the intercom platform 107 receives through the communication interface 283 context information from the registered devices.

Next, in step 511, the intercom platform 107 determines a communication mode for each of the registered devices based on the corresponding context/mode parameter. Specifically, the query module 293 of intercom platform 107 queries the context/mode parameter repository 113 for communication modes corresponding to particular communication device identifiers and associated contexts.

In step 513, the communication interface 283 of intercom platform 107 transmits communication modes to the registered communication devices that are allowed to participate in the intercom session. A device may not be allowed to participate if the mode parameter associated with a particular context that indicates the device is not allowed to participate in an intercom session. For example, is an intercom session priority is "low" and the current time is late at night, the communication mode may be "disallow intercom session." In any event, the registered communication devices that receive configuration information as a result of step 513 configure their communication modes accordingly, as will be further described with reference to FIG. 8. In step 515, the intercom platform initiates the actual intercom session amongst the pertinent communication devices.

Figure 6:
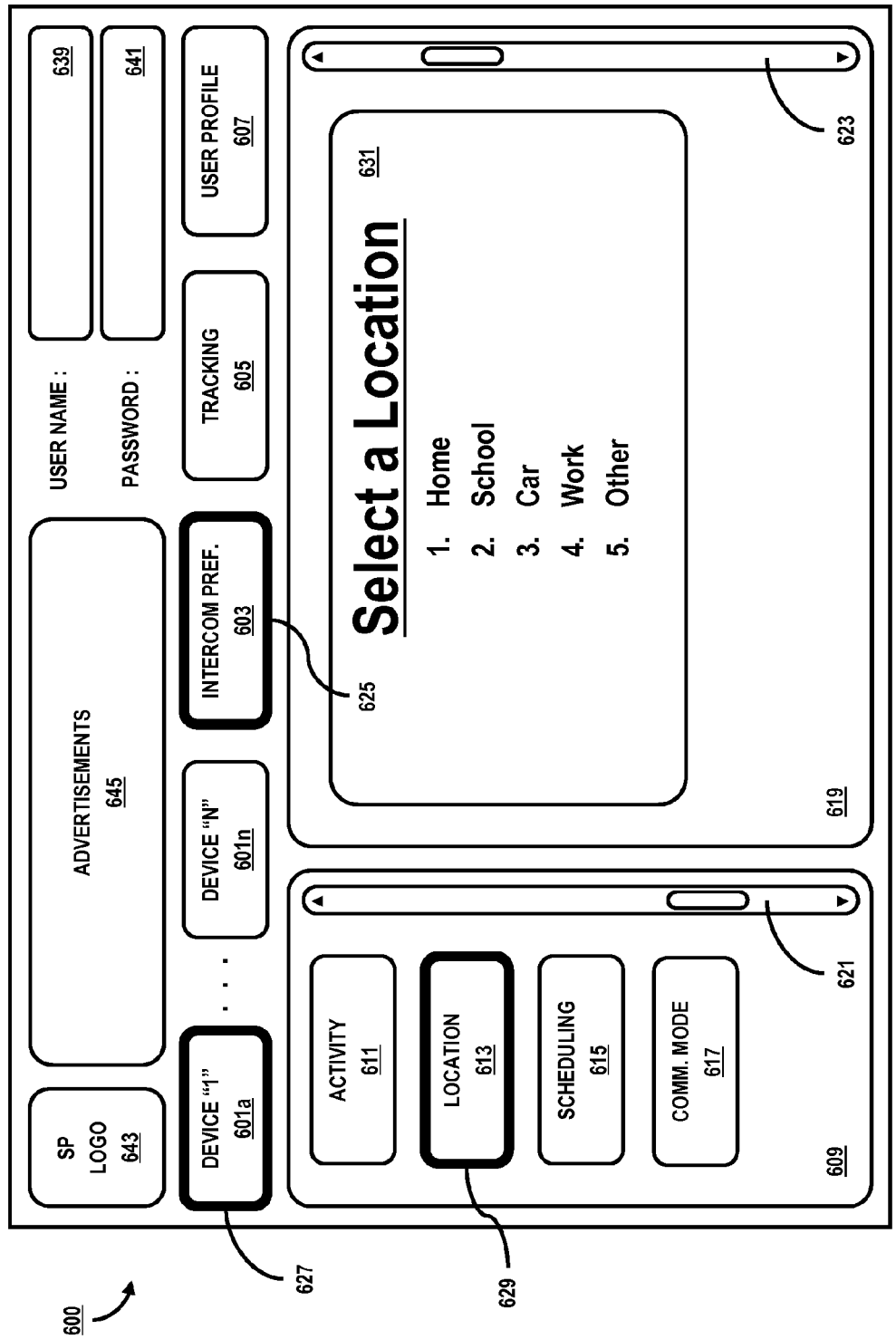
FIG. 6 is a graphical user interface (GUI) for entering user preferences for context based, multi-modal intercom communication services, according to an exemplary embodiment.

FIG. 6 is a graphical user interface (GUI) for entering user preferences for context based, multi-modal intercom communication services, according to an exemplary embodiment. In this example, it is assumed that GUI 600 is provided to a user (or subscriber) of the context based multi-modal intercom services of system 100 by portal interface 103 via, for instance, user interface module 211. It is also assumed that the subscriber is associated with one or more communication devices 101, such as computer device 101*b*. Hence, GUI 600 includes a plurality of "tabs" (or interactive interface elements) 601*a*-601*n* corresponding to registered communications devices 101 of (or associated with) the subscriber. A plurality of other tabs, e.g., "INTERCOM PREF." tab 603, "TRACKING" tab 605, and "USER PROFILE" tab 607 provide the subscriber with various functions. For instance, tab 603 enables the subscriber to provide context based communication mode preferences for each of their associated communications devices 101, whereas tab 605 enables subscribers to request and/or receive spatial positioning information corresponding to a location of one or more of their associated communications devices 101. Tab 607 enables subscribers to modify corresponding user profile information, such as to register new communications devices 101 to the context based multi-modal intercom services of system 100, update personal information, and the like.

Accordingly, selection of (or any other suitable interaction with) tab 603 toggles region 609 to an "active" context/mode indication region 609, that enables the subscriber to specify (or otherwise indicate) both contexts and associated communication modes. In this respect, selection of (or other suitable interaction with) one or more of tabs 601*a*-601*n* causes context and communication mode information provided via state indication region 609 to govern the applicable context/mode intercommunication communication preferences of corresponding communications devices 101 associated with those ones of tabs 601*a*-601*n* that have been selected.

To specify context and communication modes, state indication region 609 may include one or more selectable context identifiers (or other suitable interactive interface elements), such as "ACTIVITY" context identifier 611, "LOCATION" context identifier 613, and "SCHEDULING" context identifier 615. The "COMM. MODE" identifier 617 allows a user to select a communication mode corresponding to a particular context. In other embodiments, state indication region 609 may include one or more navigation trees, expandable table of contents, or, for example, FlashMedia presentations of selectable state identifiers, as well as other equivalent listings, menus, options, etc., for enabling a subscriber to enter context/mode information for communications devices 101.

In exemplary embodiments, interaction with a particular one of identifiers 611-617, toggles region 619 to an "active" region that describes one or more options associated with the selected one of the identifiers 611-617. In the example shown in FIG. 6, the "LOCATION" identifier 613 has been selected, and the region 619 shows a list of selectable location options. In those instances when one or more context/mode parameters require or offer customization, region 619 may further provide one or more input fields, selectable entries, pull down menus, radio buttons, etc., to enable the user to provide customized inputs.

One or more navigational elements/fields, such as scrollbars 621 and 623, may be provided and configured to indicate the existence of additional information, entries, fields, buttons, menus, etc., not displayed, but navigably available, as well as facilitate interface usability. Accordingly, the subscriber may browse to additional information, entries, fields, etc., via, for instance, an input interface of a suitable client device (e.g., computing device 101*b*), e.g., a cursor control. One or more fixed focus states (e.g., borders 625, 627, and 629) and/or distinctive magnification features, e.g., color, brightness, bolding, font type, text size, etc., may be used to convey the device(s) being designated as missing and to be remotely configured, as well as provide an indication of those features, functions, or states being "currently" employed.

According to additional exemplary embodiments, GUI 600 may include various other regions, such as a user name region 639 and a password region 641 for enabling subscribers to "log on" and obtain access to the features and functions of GUI 600. In alternative embodiments, regions 639 and 641 may be configured to correspond to other associated authentication information. It is noted that a "WELCOME, USERNAME" message may be presented to authenticated subscribers once sufficient authentication (or authorization) information is input to regions 639 and/or 641. Still further, GUI 600 may include a service provider logo region 643 to illustrate (or otherwise present) the subscriber with a logo of the service provider of the context based multi-modal intercom services of system 100, as well as include other suitable (or equivalent) regions, such as advertisement region 645, etc.

FIG. 7 is a table that shows context based communication modes for a plurality of devices, according to an exemplary embodiment. A table 701 may be stored in the context/mode parameters repository 113, and may be accessed by both the account information storage facility 105 and the intercom platform 107. The account information storage facility 105 obtains context and mode information from the user profiles repository 123 and writes that information to the table 701 in the context/mode parameters repository 113. The query module 293 of intercom platform 107 queries the table 701 for context/mode parameters in step 511 of FIG. 5.

The table 701 comprises a device identification column 703*a*, a location column 703*b*, a presence column 703*c*, an initiation column 703*d*, an activity column 703*e*, a scheduling column 703*f*, a priority column 703*g*, and a mode column 703*h*. The device identification column 703*a* stores a device code that uniquely identifies a particular one of the communication devices 101. Thus, the context/mode information in a single row of table 701 corresponds to a particular context/mode configuration for a single device. A single device may have more than one context/mode configuration and therefore be associated with many rows in the table 701.

A particular context is specified by entries in some combination of the location column 703b, presence column 703c, initiation column 703d, activity column 703e, scheduling column 703f, and priority column 703g. In other embodiments, additional columns may be added to specify other types of contexts. If one of the columns 703b-703g has an entry for a particular row, that entry specifies a particular aspect of the context configuration for the row. For example, if the location column 703b includes an entry "Car" in a particular row, then the context configuration corresponding to that row may be matched when the associated device, e.g., "XXXX", is located within a car. If one of the columns 703b-703g does not have an entry for a particular row, then the context configuration corresponding to that row may be matched regardless of the context associated with that column. For example, if the location column 703b is blank in a particular row, then the context configuration corresponding to that row may be matched regardless of the location of the associated device.

The initiation column 703d entry for a particular row indicates whether an intercom session is initiated by the device associated with the row, or by a different device. The scheduling column 703f indicates times and/or dates that constrain a particular context. For example, if the user of a communication device does not want the device to respond to intercom requests in the evening, then the scheduling column 703f may including an appropriate entry that specifies that time period.

The second and third rows of table 701 show examples of particular context configurations for a device "XXXX." The second row is a context wherein device "XXXX" is located within a car, the intercom session has been initiated by another device, the user associated with device "XXXX" is driving, and the intercom session has a high priority. In this context, the mode column 703h specifies that the communication mode is hands-free communication. The third row is a context wherein device "XXXX" is located within a car and the user associated with device "XXXX" is not driving. In this context, the mode column 703h specifies that the communication mode is text based. Additionally, "XXXX" can provide a video mode of communication while located within a particular premise (e.g., home) of the user.

Figure 8:
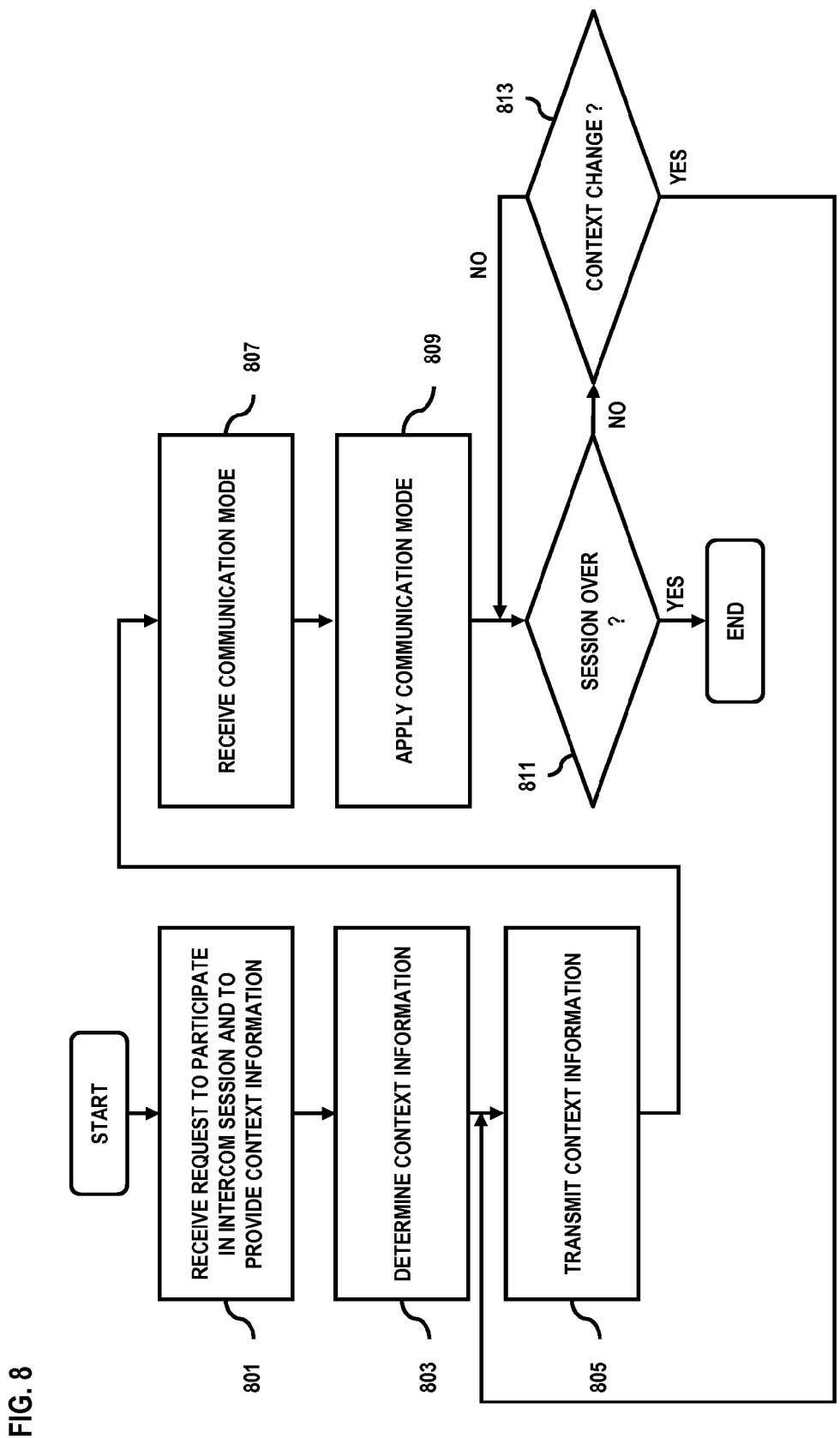
FIGS. 8 and 9 are flowcharts of processes implemented by a communication device for participating in a context based, multi-modal intercom communication session, according to an exemplary embodiment.
Figure 9:
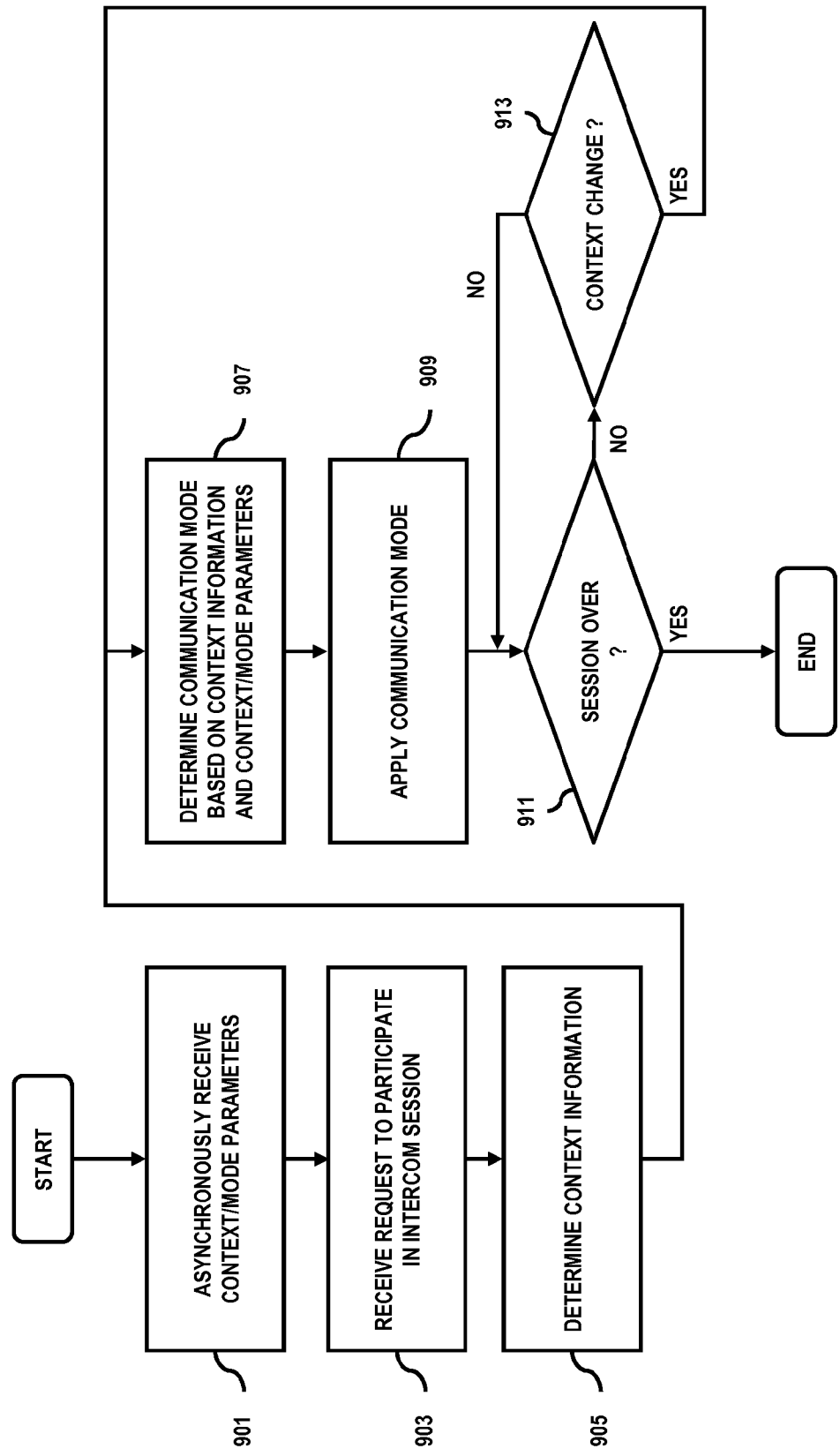

FIGS. 8 and 9 are flowcharts of processes implemented by a communication device for participating in a context based, multi-modal intercom communication session, according to an exemplary embodiment. For illustrative purposes, the process is described with respect to FIGS. 1 and 3. It is also noted that the process involves, for example, one of the communication devices 101 having been requested to join in an intercom session. For convenience, the communication device will be assumed to be mobile device 300 shown in FIG. 3. Further, the steps of the process may be performed in any suitable order, as well as combined or separated in any suitable manner. As seen in FIG. 8, at step 801, the mobile device 300 receives via, for example, transceiver 327 a request from, for example, intercom platform 107, to participate in an intercom session, and to provide context information.

In step 803, the mobile device 300 determines context information, which may include, without limitation, the location of the mobile device 300, the current time (in the time zone in which the mobile device 300 is located), and activity and presence information pertaining to the user of the mobile device 300. The location of the mobile device 300 may be determined by the location module 319. The mobile device 300 may prompt the user for activity and presence information by issuing a suitable message or alert through speaker 313 or display 307. Activity and presence information may be entered by the user through any combination of display 307, keypad 309 and microphone 311. Presence and activity information may also be determined automatically or semi-automatically by the interaction of mobile device 300 with its environment.

Next, in step 805, the mobile device 300 transmits via, for example, transceiver 327, the context information to, for example, intercom platform 107. In step 807, the mobile device 300 receives via, for example, transceiver 327, the communication mode from, for example, intercom platform 107. Communication modes include, without limitation, speech or text. Speech communication modes include regular and hands-free modes. Communication modes may also include the manner of alerting the user that an intercom session has been requested. For example, the mobile device 300 may emit a ring tone through speaker 313, may cause the display 307 to flash or otherwise indicate an incoming intercom session request. The mobile device 300 may also vibrate or otherwise provide an indication that an intercom session request has been received.

In step 809, the mobile device 300 applies the communication mode that was received during the performance of step 807. A speech communication mode may include activation of microphone 311 and speaker 313 through audio processing circuitry under control of controller 317. A video communication mode may include activation of microphone 311, speaker 313, and one or more cameras 310 (e.g., front camera and back camera) through video processing circuitry 316 under control of controller 317. If the communication mode is hands free speech, then the controller 317 may instead activate wireless controller 331 to communicate with a wireless headset (not shown). If the communication mode is text only, the controller 317 may display intercom communications received through transceiver 327 on the display 307, and transmit the user's intercom communications, entered through user interface 305, through transceiver 327. Other communication modes are possible.

In step 811, the mobile device 300 determines whether the intercom session has ended. If so, then the mobile device 300 terminates its processes associated with the intercom session. Otherwise, if the intercom session is ongoing, step 811 invokes step 813, which periodically checks for context changes. If a context change has occurred, step 805 is invoked, and steps 807 and 809 are repeated. Otherwise, step 813 invokes step 811.

FIG. 9 is a flowchart of a process implemented by a communication device for participating in a context based, multi-modal intercom communication session, according to an alternative embodiment. According to the process shown in FIG. 9, context/mode parameters are provided asynchronously by the intercom platform 107 to the communication devices 101, which select the context based communication mode upon initiation of an intercom session. For convenience, the communication device will be assumed to be mobile device 300 shown in FIG. 3.

In step 901, the communication device 101 receives context/mode parameters from the intercom platform 107, and stores them in memory 323 through the operation of controller 317. According to one embodiment, the intercom platform 107 transmits context/mode parameters to selected ones of the communications devices 101 whenever the context/mode parameter repository 113 has been updated with new context/mode parameters associated with the selected devices. In this case, the presence service module 291 of intercom platform 107 determines whether the selected devices are available to receive context/mode parameters. If so, the context/mode parameters are transmitted. Otherwise, the context/mode parameters are ported to the queue module 295, which ensures that the context/mode parameters are transmitted when the relevant communication devices become available.

The context/mode parameter reception step 901 is performed asynchronously, i.e. without regard to the initiation of an intercom session, which may occur at any time after the context/mode parameters are received. Thus, it will be appreciated that step 903, which involves the reception by the communication device 300 of a request to participate in an intercom session, need not directly follow step 901. The request to participate in an intercom session may be transmitted by the intercom platform 107 or may occur directly from another one of the communication devices 101 over the networks 115-121.

In step 905, the mobile device 300 determines context in a manner analogous to step 803 of FIG. 8. In step 907, the mobile device 300 determines the communication mode based on the context information and context/mode parameters. In particular, the controller 317 queries the memory 323 to determine which context configuration, stored in connection with step 801, matches the context determined in step 805. Next, in step 909, the corresponding communication mode is applied by the mobile device 300 in a manner analogous to step 809 of FIG. 8.

In step 911, the mobile device 300 determines whether the intercom session has ended. If so, then the mobile device 300 terminates its processes associated with the intercom session. Otherwise, if the intercom session is ongoing, step 911 invokes step 913, which periodically checks for context changes. If a context change has occurred, step 907 is invoked, and steps 907-909 are repeated. Otherwise, step 913 invokes step 911.

In yet another alternative embodiment, instead of the mobile device 300 receiving context/mode parameters from an external source such as the intercom platform 107, as per step 901, a user may input context/mode parameters directly into the mobile device 300. More generally, the user may input context/mode parameters to any of the communication devices 101. These parameters may be entered through a graphical user interface such as that describe with reference to FIG. 6. Steps 903 through 913 may then be performed in the manner described above.

The processes described herein for providing context based multi-modal intercom services for missing mobile devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
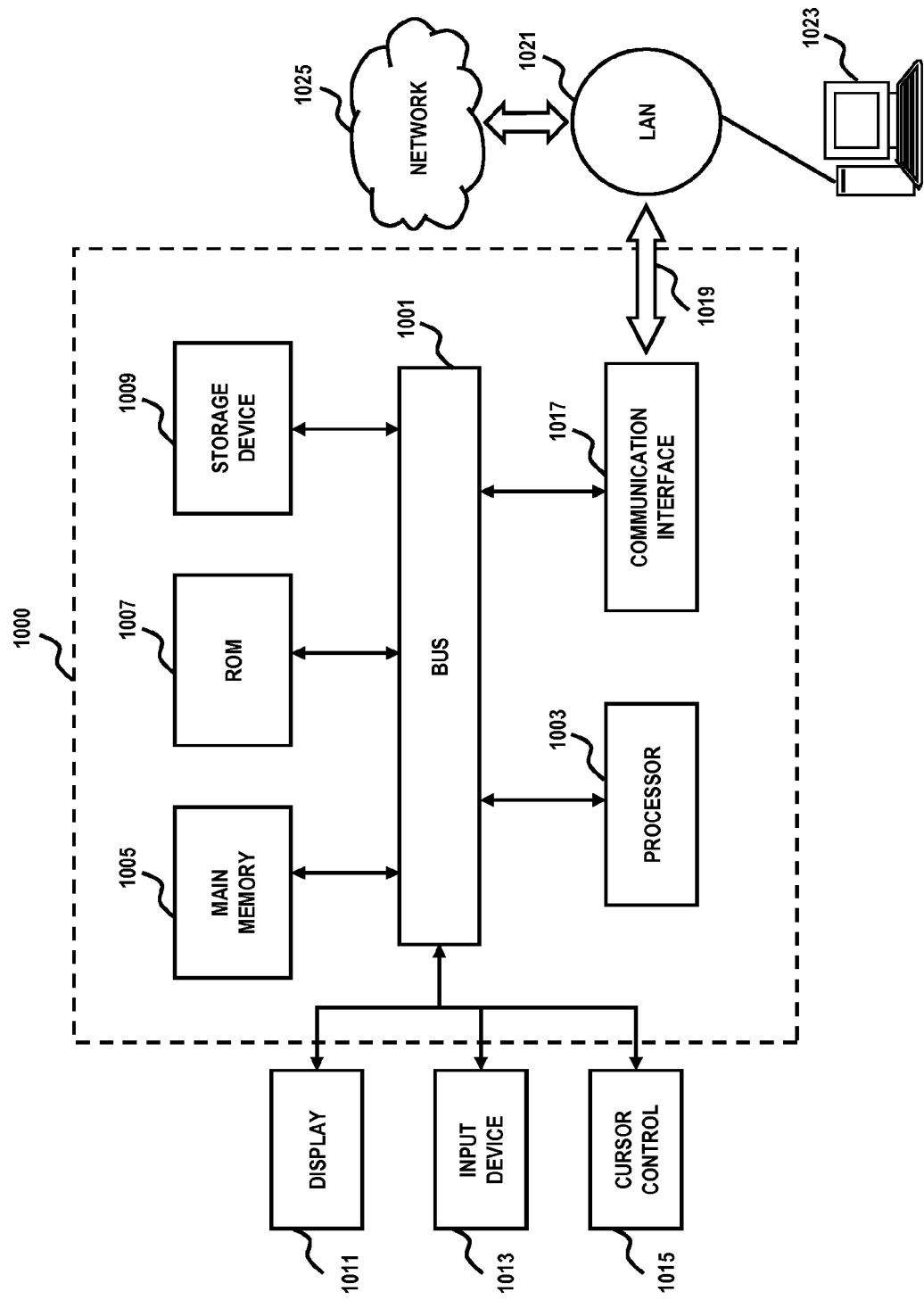
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting a control signal to invoke an intercom service;
   determining, at an intercom platform, context information associated with one or more user communication devices among a plurality of user communication devices, wherein the context information specifies information relating to an activity physically engaged in by one or more users who are associated respectively with the one or more user communication devices, wherein the activity occurs independent from the one or more user communication devices;
   customizing the intercom service for the one or more of the user communication devices based upon the activity;
   receiving, by the intercom platform, a user input via a portal of one of the user communication devices specifying one or more parameters of the context information, wherein the intercom platform is embedded in the one user communication device; and
   initiating, by the intercom platform, establishment of an intercom mode of user-device-to-user-device communication session among the plurality of user communication devices based on the context information,
   wherein the customized intercom service includes one or more communication rendering modes customized for the one or more of the user communication devices physically engaged in the activity.

2. A method according to claim 1, wherein the control signal is generated by one of the user communication devices in response to a request for the intercom mode communication session directly from another one of the user communication devices, the intercom mode of user-device-to-user-device communication session includes two-way intercom mode communication among the plurality of user communication devices, and the context information is associated with the one user communication device, the method further comprising:
   determining, by the intercom platform, whether the intercom mode of user-device-to-user-device communication session is requested to be speech-based, video-based, or temporarily text-based using the context information.

3. A method according to claim 1, wherein at least one of the user communication devices is automatically activated, without user intervention, to participate in the intercom mode of user-device-to-user-device communication session, and wherein the one or more communication rendering modes include speech, hands-free, text, video, or a combination thereof.

4. A method according to claim 1, wherein the context information specifies one or more locations of the one or more user communication devices, presence information of the one or more user communication devices, scheduling information relating to when the intercom service can be activated for the one or more user communication devices, or a combination thereof.

5. A method according to claim 2, wherein the one or more user communication devices include a mobile phone that provides hands-free operation when engaged in the intercom mode of user-device-to-user-device communication session with one or more other mobile phone among the user communication devices, and
   wherein the activity physically engaged in by the one or more users includes driving.

6. An apparatus comprising:
   at least one processor; and
   at least one memory including computer program code for one or more programs,
   the at least one memory and the computer program code configured to, with the at least one processor, cause the apparatus to perform at least the following,
      detect a control signal to invoke an intercom service,
      determine context information associated with one or more user communication devices among a plurality of user communication devices, wherein the context information specifies information relating to an activity physically engaged in by one or more users who are associated respectively with the one or more user communication devices, wherein the activity occurs independent from the one or more user communication devices, customize the intercom service for the one or more of the user communication devices based upon the activity, receive a user input via a portal of one of the user communication devices specifying one or more parameters of the context information, wherein the intercom platform is embedded in the one user communication device, and initiate establishment of an intercom mode of user-device-to-user-device communication session among the plurality of user communication devices based on the context information, wherein the customized intercom service includes one or more communication rendering modes customized for the one or more of the user communication devices physically engaged in the activity.

7. An apparatus according to claim 6, wherein the control signal is generated by one of the user communication devices in response to a request for the intercom mode of user-device-to-user-device communication session directly from another one of the user communication devices, and the context information is associated with the one user communication device, wherein the apparatus is further caused to:

determine whether the intercom mode of user-device-to-user-device communication session is requested to be speech-based, video-based, or temporarily text-based using the context information.

8. An apparatus according to claim 6, wherein at least one of the user communication devices is automatically activated, without user intervention, to participate in the intercom mode of user-device-to-user-device communication session.

9. An apparatus according to claim 6, wherein the context information specifies one or more locations of the one or more user communication devices, presence information of the one or more user communication devices, scheduling information relating to when the intercom service can be activated for the one or more user communication devices, or a combination thereof.

10. An apparatus according to claim 6, wherein the one or more user communication devices include a mobile phone that provides hands-free operation when engaged in the intercom mode of user-device-to-user-device communication session.

11. A method comprising:

receiving, at an intercom platform, a request to subscribe to an intercom service for a user;

designating by the intercom platform, in response to the request, one or more user communication devices associated with the user to activate for the intercom service; and defining, by the intercom platform, context information for invoking an intercom mode of user-device-to-user-device communication session to be established among the one or more user communication devices, wherein the context information specifies information relating to an activity physically engaged in by one or more users who are associated respectively with the one or more user communication devices, wherein the activity occurs independent from the one or more user communication devices, customizing the intercom service for the one or more of the user communication devices based upon the activity, and receiving, by the intercom platform, a user input via a portal of one of the user communication devices specifying one or more parameters of the context information, wherein the intercom platform is embedded in the one user communication device, wherein the customized intercom service includes one or more communication rendering modes customized for the one or more of the user communication devices physically engaged in the activity.

12. A method according to claim 11, wherein at least one of the user communication devices is automatically activated, without user intervention, to participate in the intercom mode of user-device-to-user-device communication session.

13. A method according to claim 11, wherein the context information specifies scheduling information relating to when the intercom service can be activated for the one or more user communication devices.

14. An apparatus comprising:

at least one processor; and at least one memory including computer program code for one or more programs, the at least one memory and the computer program code configured to, with the at least one processor, cause the apparatus to perform at least the following, receive a request to subscribe to an intercom service for a user, designate, in response to the request, one or more user communication devices associated with the user to activate for the intercom service, and define context information for customizing and invoking an intercom mode of user-device-to-user-device communication session to be established among the one or more user communication devices, wherein the context information specifies information relating to an activity physically engaged in by one or more users who are associated respectively with the one or more user communication devices, wherein the activity occurs independent from the one or more user communication devices, customize the intercom service for the one or more of the user communication devices based upon the activity, and receive a user input via a portal of one of the user communication devices specifying one or more parameters of the context information, wherein the apparatus is embedded in the one user communication device, wherein the customized intercom service includes one or more communication rendering modes customized for the one or more of the user communication devices physically engaged in the activity.

15. An apparatus according to claim 14, wherein at least one of the user communication devices is automatically activated, without user intervention, to participate in the intercom mode of user-device-to-user-device communication session.

16. An apparatus according to claim 14, wherein the context information specifies one or more locations of the one or more user communication devices, presence information of the one or more user communication devices, scheduling information relating to when the intercom service can be activated for the one or more user communication devices, or a combination thereof.

17. A method according to claim 1, wherein the portal includes a voice browser, an interactive voice recognition system, or a combination thereof.

* * * * *